US012670578B2

(12) United States Patent
Akkiraju et al.

(10) Patent No.: US 12,670,578 B2
(45) Date of Patent: Jun. 30, 2026

(54) LAYOUT-BASED WAFER DEFECT IDENTIFICATION AND CLASSIFICATION USING SEPARATELY GENERATED PREDICTED IMAGES AND PREDICTED LAYOUT DESIGNS

(71) Applicant: Siemens Industry Software Inc., Plano, TX (US)

(72) Inventors: Nataraj Akkiraju, Fremont, CA (US); Qian Xie, San Jose, CA (US)

(73) Assignee: Siemens Industry Software Inc., Plano, TX (US)

( * ) Notice: Subject to any disclaimer, the term of this patent is extended or adjusted under 35 U.S.C. 154(b) by 702 days.

(21) Appl. No.: 17/804,618

(22) Filed: May 31, 2022

(65) Prior Publication Data

US 2023/0386015 A1      Nov. 30, 2023

(51) Int. Cl.
*G06T 7/00* (2017.01)

(52) U.S. Cl.
CPC .......... *G06T 7/0006* (2013.01); *G06T 7/0008* (2013.01); *G06T 7/001* (2013.01); *G06T 2207/10061* (2013.01); *G06T 2207/20081* (2013.01); *G06T 2207/30148* (2013.01)

(58) Field of Classification Search
CPC .................. G06T 7/001; G06T 7/0006; G06T 2207/10061; G06T 2207/20081; G06T 2207/30148; G06T 7/0008; G06T 2207/20084; G06T 2207/20132
See application file for complete search history.

(56) References Cited

U.S. PATENT DOCUMENTS

| | | | |
|---|---|---|---|
| 6,987,873 | B1 | 1/2006 | Ben-Porath et al. |
| 10,628,935 | B2 * | 4/2020 | Zhang ..................... G06T 7/001 |
| 2009/0268959 | A1 * | 10/2009 | Harada ................. G06T 7/0004 |
| | | | 382/218 |

(Continued)

OTHER PUBLICATIONS

Qian Xie, Panneerselvam Venkatachalam, Julie Lee, Zhijin Chen, Khurram Zafar, "Design guided data analysis for summarizing systematic pattern defects and process window," Proc. SPIE 9778, Metrology, Inspection, and Process Control for Microlithography, Mar. 8, 2016.

(Continued)

*Primary Examiner* — Michael P LaPage

(57) ABSTRACT

This application discloses a scanning electron microscope system to capture an image of an electronic device manufactured according to a layout design describing the electronic device, and a computing system to generate a predicted image of the electronic device using the layout design. The predicted image corresponds to an expected image of the electronic design system captured by the scanning electron microscope system. The computing system identifies manufacturing defects present in the electronic device based on differences between the predicted image of the electronic device and the captured image of the electronic device, and utilizes the captured image of the electronic device to classify the manufacturing defects identified based on the predicted image of the electronic device from the layout design. The computing system can generate a manufacturing defect report identifying the manufacturing defects used to perform repair of the electronic device or modification of the layout design.

17 Claims, 7 Drawing Sheets

(56) References Cited

U.S. PATENT DOCUMENTS

| | | | | |
|---|---|---|---|---|
| 2010/0158343 A1* | 6/2010 | Bryll | ........................ | G02B 7/36 |
| | | | | 382/141 |
| 2013/0070078 A1* | 3/2013 | Takagi | ................... | G06T 7/001 |
| | | | | 348/80 |
| 2013/0287287 A1* | 10/2013 | Lin | ........................ | G06T 7/001 |
| | | | | 382/141 |
| 2016/0180513 A1 | 6/2016 | Park et al. | | |
| 2018/0196340 A1* | 7/2018 | Kohli | ........................ | G03F 1/36 |
| 2018/0218492 A1* | 8/2018 | Zhang | ................. | G06T 7/0006 |
| 2018/0322234 A1* | 11/2018 | Cao | ......................... | G06F 30/39 |
| 2019/0147127 A1* | 5/2019 | Su | .......................... | G03F 7/705 |
| | | | | 703/7 |
| 2019/0228522 A1* | 7/2019 | Shinoda | ................. | G06T 7/001 |
| 2019/0287238 A1* | 9/2019 | Sriraman | .............. | G06N 20/00 |
| 2020/0089130 A1* | 3/2020 | Chao | .................... | G03F 7/7065 |
| 2020/0320246 A1* | 10/2020 | Wang | ...................... | G06F 30/20 |
| 2021/0035277 A1* | 2/2021 | Ishikawa | .................. | G06T 5/73 |
| 2021/0081509 A1* | 3/2021 | Salik | .................... | G06F 30/398 |
| 2021/0174000 A1* | 6/2021 | Chuang | ................ | G06F 30/394 |
| 2022/0092799 A1* | 3/2022 | Yan | .......................... | G06T 5/70 |
| 2022/0137503 A1* | 5/2022 | Tao | ........................... | G03F 1/36 |
| | | | | 716/53 |
| 2023/0013887 A1* | 1/2023 | Ito | ......................... | G06T 7/0006 |
| 2023/0081821 A1* | 3/2023 | Batistakis | .......... | G03F 7/70483 |
| | | | | 382/145 |
| 2023/0359805 A1* | 11/2023 | Kim | ..................... | G06T 7/0006 |
| 2023/0377127 A1* | 11/2023 | Kent | ..................... | G06V 10/16 |
| 2024/0054669 A1* | 2/2024 | Houben | .................... | G06T 5/50 |
| 2024/0212131 A1* | 6/2024 | Lei | .......................... | G06T 7/001 |
| 2025/0003899 A1* | 1/2025 | Houben | .................. | G06T 5/60 |
| 2025/0166166 A1* | 5/2025 | Jin | ........................ | G06T 7/0006 |

OTHER PUBLICATIONS

T. A. Esposito, Jay Shah, Abhinav Jain, Felix Levitov, John G. Sheridan, Shashi Shekhar, Shih-Hui Jen, Victor Aristov, and Hoang Nguyen, "Integration of Computer-Aided Design (CAD) Information into a Defect-Review SEM Platform and Design Based Automatic Defect Classification : DI: Defect Inspection and Reduction," 2019 30th Annual SEMI Advanced Semiconductor Manufacturing Conference (ASMC), pp. 1-6, Aug. 8, 2019.

* cited by examiner

DEFECT IDENTIFICATION SYSTEM

400

CAPTURED IMAGE 520

DEFECT AREA 522

PREDICTED IMAGE 510

LAYOUT DESIGN 500

LAYOUT DESIGN 620

PREDICTED LAYOUT 610

CAPTURED IMAGE 600

DEFECT AREA 602

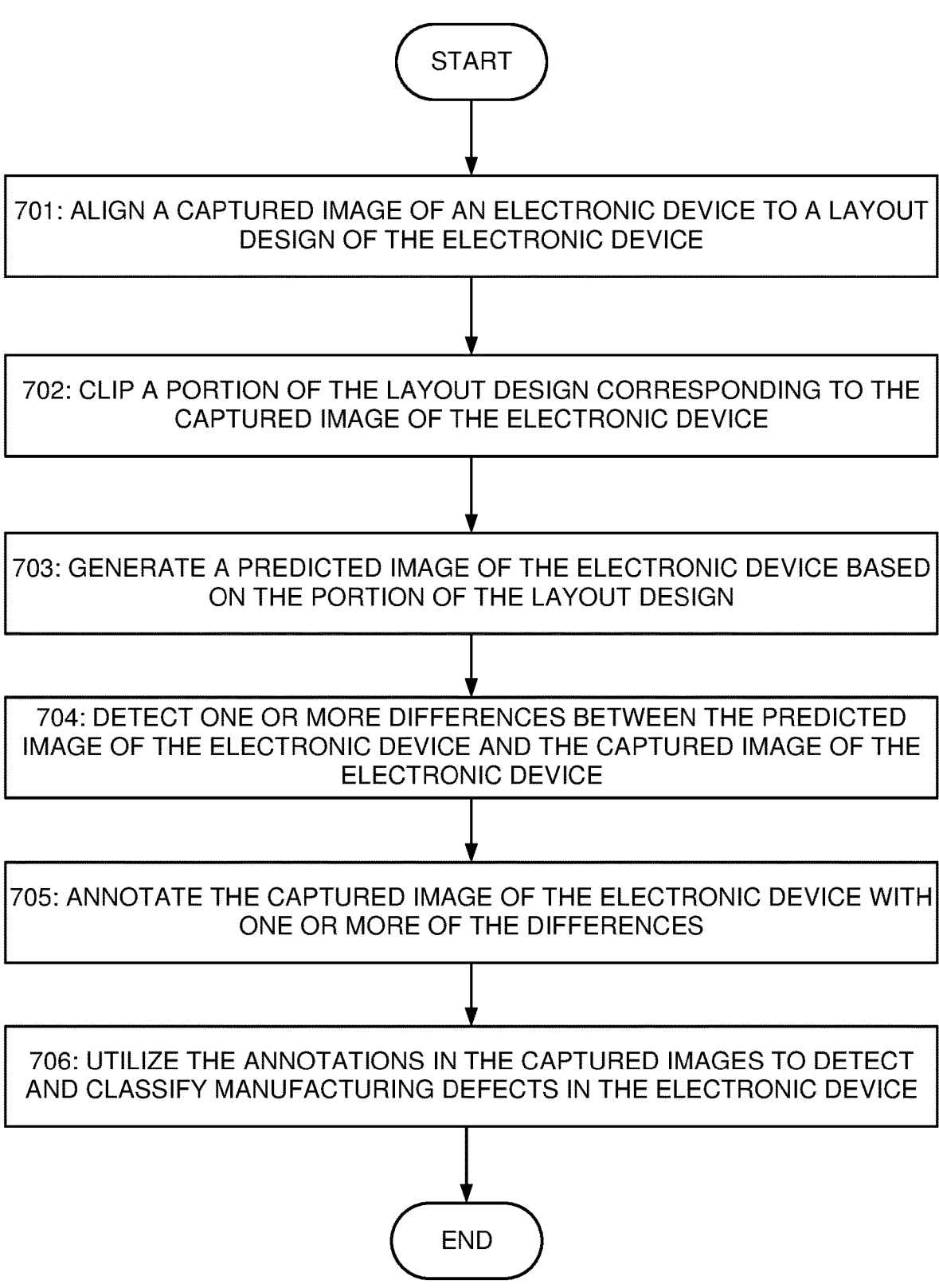

START

701: ALIGN A CAPTURED IMAGE OF AN ELECTRONIC DEVICE TO A LAYOUT DESIGN OF THE ELECTRONIC DEVICE

702: CLIP A PORTION OF THE LAYOUT DESIGN CORRESPONDING TO THE CAPTURED IMAGE OF THE ELECTRONIC DEVICE

703: GENERATE A PREDICTED IMAGE OF THE ELECTRONIC DEVICE BASED ON THE PORTION OF THE LAYOUT DESIGN

704: DETECT ONE OR MORE DIFFERENCES BETWEEN THE PREDICTED IMAGE OF THE ELECTRONIC DEVICE AND THE CAPTURED IMAGE OF THE ELECTRONIC DEVICE

705: ANNOTATE THE CAPTURED IMAGE OF THE ELECTRONIC DEVICE WITH ONE OR MORE OF THE DIFFERENCES

706: UTILIZE THE ANNOTATIONS IN THE CAPTURED IMAGES TO DETECT AND CLASSIFY MANUFACTURING DEFECTS IN THE ELECTRONIC DEVICE

END

FIG. 7

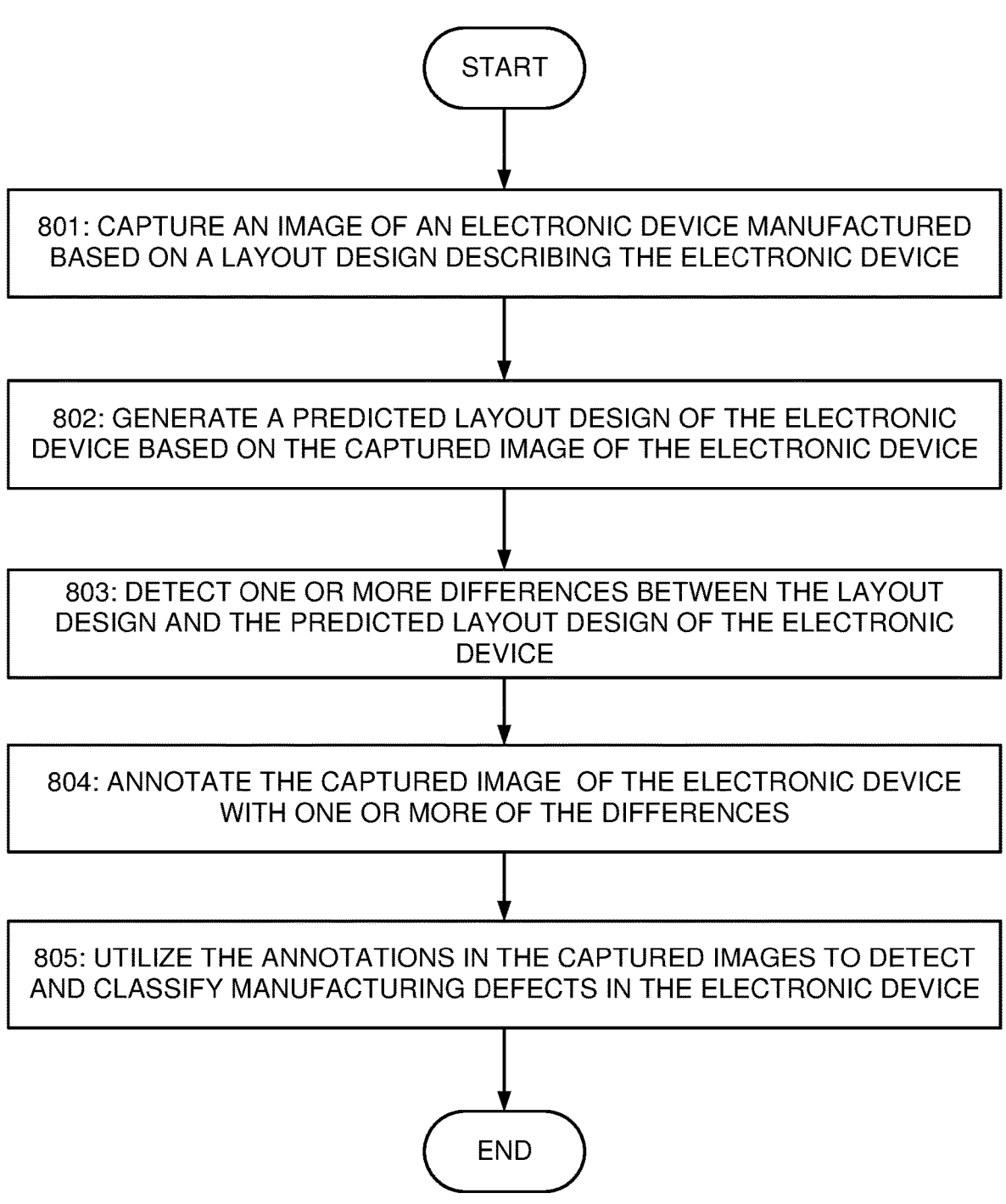

START

801: CAPTURE AN IMAGE OF AN ELECTRONIC DEVICE MANUFACTURED BASED ON A LAYOUT DESIGN DESCRIBING THE ELECTRONIC DEVICE

802: GENERATE A PREDICTED LAYOUT DESIGN OF THE ELECTRONIC DEVICE BASED ON THE CAPTURED IMAGE OF THE ELECTRONIC DEVICE

803: DETECT ONE OR MORE DIFFERENCES BETWEEN THE LAYOUT DESIGN AND THE PREDICTED LAYOUT DESIGN OF THE ELECTRONIC DEVICE

804: ANNOTATE THE CAPTURED IMAGE OF THE ELECTRONIC DEVICE WITH ONE OR MORE OF THE DIFFERENCES

805: UTILIZE THE ANNOTATIONS IN THE CAPTURED IMAGES TO DETECT AND CLASSIFY MANUFACTURING DEFECTS IN THE ELECTRONIC DEVICE

END

FIG. 8

LAYOUT-BASED WAFER DEFECT IDENTIFICATION AND CLASSIFICATION USING SEPARATELY GENERATED PREDICTED IMAGES AND PREDICTED LAYOUT DESIGNS

TECHNICAL FIELD

This application is generally related to electronic design automation and, more specifically, to layout-based wafer defect identification and machine learning classification.

BACKGROUND

In a design flow for fabricating integrated circuits, a physical design of an integrated circuit can describe specific geometric elements, often referred to as a layout design. The geometric elements, which typically are polygons, define the shapes that will be created in various materials to manufacture the integrated circuit. Typically, a designer will select groups of geometric elements representing circuit device components, e.g., contacts, gates, etc., and place them in a design area. These groups of geometric elements may be custom designed, selected from a library of previously-created designs, or some combination of both. Once the groups of geometric elements representing circuit device components have been placed, geometric elements representing connection lines are then placed between these geometric elements according to the predetermined route. These lines will form the wiring used to interconnect the electronic devices.

Descriptions for physical designs of integrated circuits can be provided in many different formats. The Graphic Data System II (GDSII) format is a popular format for transferring and archiving two-dimensional (2D) graphical circuit layout data. Among other features, it contains a hierarchy of structures, each structure including layout elements (e.g., polygons, paths or poly-lines, circles and text-boxes). Other formats include an open source format named Open Access, Milkyway, EDDM, and Open Artwork System Interchange Standard (OASIS). These various industry formats are used to define the geometrical information in layout designs that are employed to manufacture integrated circuits. Once the design is finalized, the layout portion of the design can be used by fabrication tools to manufacture the circuit using a photolithographic process.

There are many different fabrication processes for manufacturing a circuit, but most processes include a series of steps that deposit layers of different materials on a substrate, expose specific portions of each layer to radiation, and then etch the exposed (or non-exposed) portions of the layer away. For example, a simple semiconductor device component could be manufactured by the following steps. First, a positive type epitaxial layer is grown on a silicon substrate through chemical vapor deposition. Next, a nitride layer is deposited over the epitaxial layer. Then specific areas of the nitride layer are exposed to radiation, and the exposed areas are etched away, leaving behind exposed areas on the epitaxial layer, (i.e., areas no longer covered by the nitride layer). The exposed areas then are subjected to a diffusion or ion implantation process, causing dopants, for example phosphorus, to enter the exposed epitaxial layer and form charged wells. This process of depositing layers of material on the substrate or subsequent material layers, and then exposing specific patterns to radiation, etching, and dopants or other diffusion materials, is repeated a number of times, allowing the different physical layers of the circuit to be manufactured.

Each time that a layer of material is exposed to radiation, a mask is created to expose only the desired areas to the radiation, and to protect the other areas from exposure. The mask is created from circuit layout data. That is, the geometric elements described in a layout design define the relative locations or areas of the circuit that will be exposed to radiation through the mask. A mask or reticle writing tool is used to create the mask based upon the layout design, after which the mask can be used in a photolithographic process.

As designers and manufacturers continue to increase the number of circuit components in a given area and/or shrink the size of circuit components, the shapes reproduced on the substrate (and thus the shapes in the mask) become smaller and are placed closer together. This reduction in feature size increases the difficulty of faithfully reproducing the image intended by the layout design onto the substrate. The diffractive effects of light often result in defects where the intended image is not accurately printed onto the substrate during the photolithographic process, creating flaws in the manufactured device.

Wafer defect detection and yield analysis can be employed to identify these flaws in the manufactured device. A Scanning Electron Microscope (SEM) can be utilized to capture a SEM image of the manufactured device, which can be utilized to detect and classify the defect in an attempt to discover the root cause of the defect and perform repair. In the absence of automation, engineers spend hours on manual defect classification. Automated defect classification can analyze the SEM images, for example, by extracting contours of shapes from the images, calculating the differences between the contours and the geometric elements in the layout design of the manufactured device to identify defect locations, and then filtering them to determine defect types. While these automated defect classification techniques can reduce inconsistency of manual classification, but they also have their limitations, as they often require significant manual calibration and tuning for the contour extraction, they support only limited types of defects, and the filtering process can be extensive and time-consuming.

SUMMARY

This application discloses a scanning electron microscope system to capture an image of an electronic device manufactured according to a layout design describing the electronic device, and a computing system to generate a predicted image of the electronic device using the layout design. The predicted image corresponds to an expected image of the electronic design system captured by the scanning electron microscope system. The computing system identifies manufacturing defects present in the electronic device based on differences between the predicted image of the electronic device and the captured image of the electronic device, and utilizes the captured image of the electronic device to classify the manufacturing defects identified based on the predicted image of the electronic device from the layout design. The computing system can generate a manufacturing defect report identifying the manufacturing defects used to perform repair of the electronic device or modification of the layout design. Embodiments of will be described below in greater detail.

DESCRIPTION OF THE DRAWINGS

FIG. 7 illustrates a flowchart showing example machine learning-based defect detection and classification with a predicted image of the electronic device according to various examples.

FIG. 8 illustrates a flowchart showing example machine learning-based defect detection and classification with a predicted layout design of the electronic device according to various examples.

DETAILED DESCRIPTION

Illustrative Operating Environment

Figure 1:
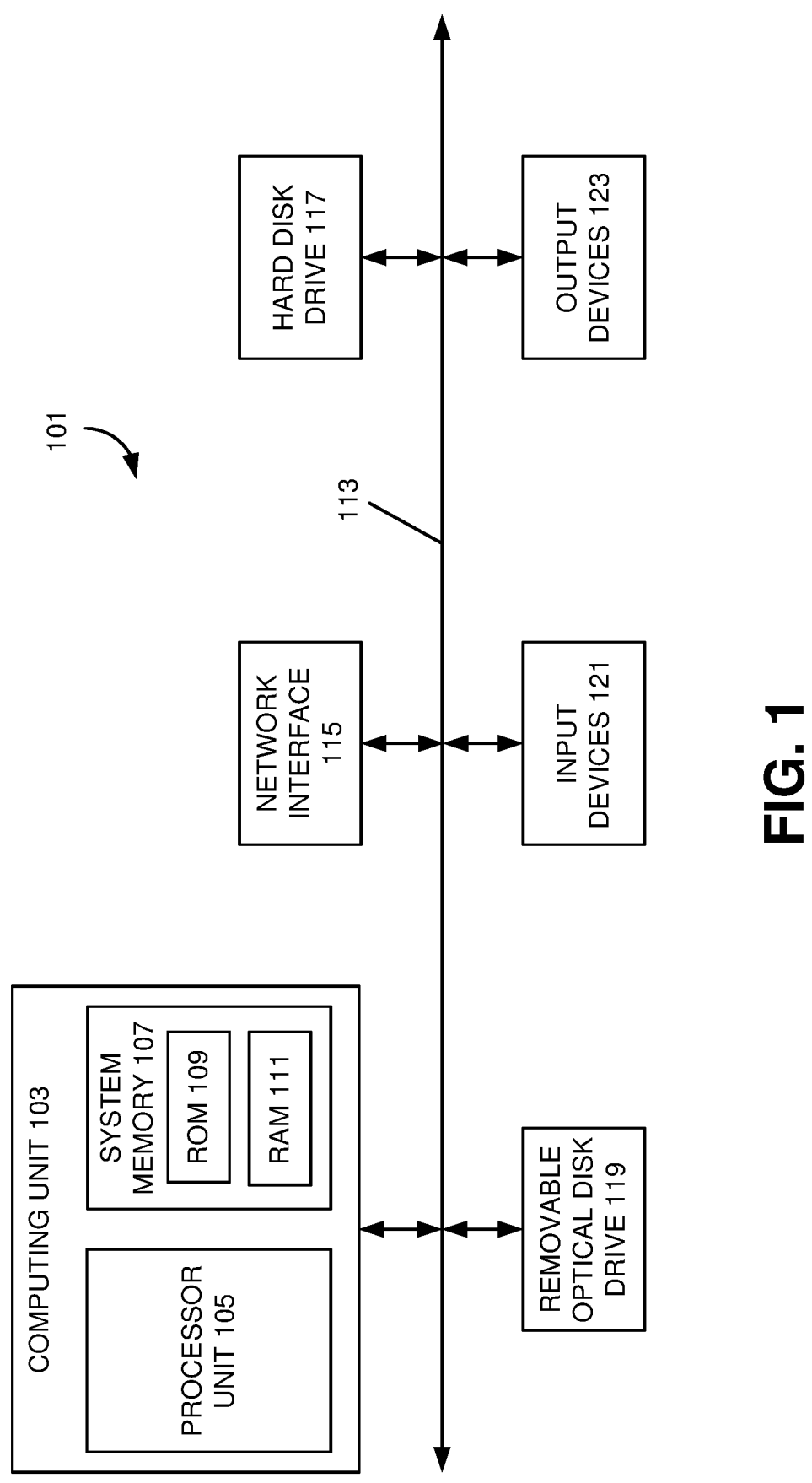
FIGS. 1 and 2 illustrate an example of a computer system of the type that may be used to implement various embodiments.

Various examples may be implemented through the execution of software instructions by a computing device 101, such as a programmable computer. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices 115-123. For example, the processing unit 105 or the system memory 107 may be directly or indirectly connected to one or more additional memory storage devices, such as a hard disk drive 117, which can be magnetic and/or removable, a removable optical disk drive 119, and/or a flash memory card. The processing unit 105 and the system memory 107 also may be directly or indirectly connected to one or more input devices 121 and one or more output devices 123. The input devices 121 may include, for example, a keyboard, a pointing device (such as a mouse, touchpad, stylus, trackball, or joystick), a scanner, a camera, and a microphone. The output devices 123 may include, for example, a monitor display, a printer and speakers. With various examples of the computing device 101, one or more of the peripheral devices 115-123 may be internally housed with the computing unit 103. Alternately, one or more of the peripheral devices 115-123 may be external to the housing for the computing unit 103 and connected to the bus 113 through, for example, a Universal Serial Bus (USB) connection.

With some implementations, the computing unit 103 may be directly or indirectly connected to a network interface 115 for communicating with other devices making up a network. The network interface 115 can translate data and control signals from the computing unit 103 into network messages according to one or more communication protocols, such as the transmission control protocol (TCP) and the Internet protocol (IP). Also, the network interface 115 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computing device 101 is illustrated as an example only, and it not intended to be limiting. Various embodiments may be implemented using one or more computing devices that include the components of the computing device 101 illustrated in FIG. 1, which include only a subset of the components illustrated in FIG. 1, or which include an alternate combination of components, including components that are not shown in FIG. 1. For example, various embodiments may be implemented using a multi-processor computer, a plurality of single and/or multiprocessor computers arranged into a network, or some combination of both.

Figure 2:
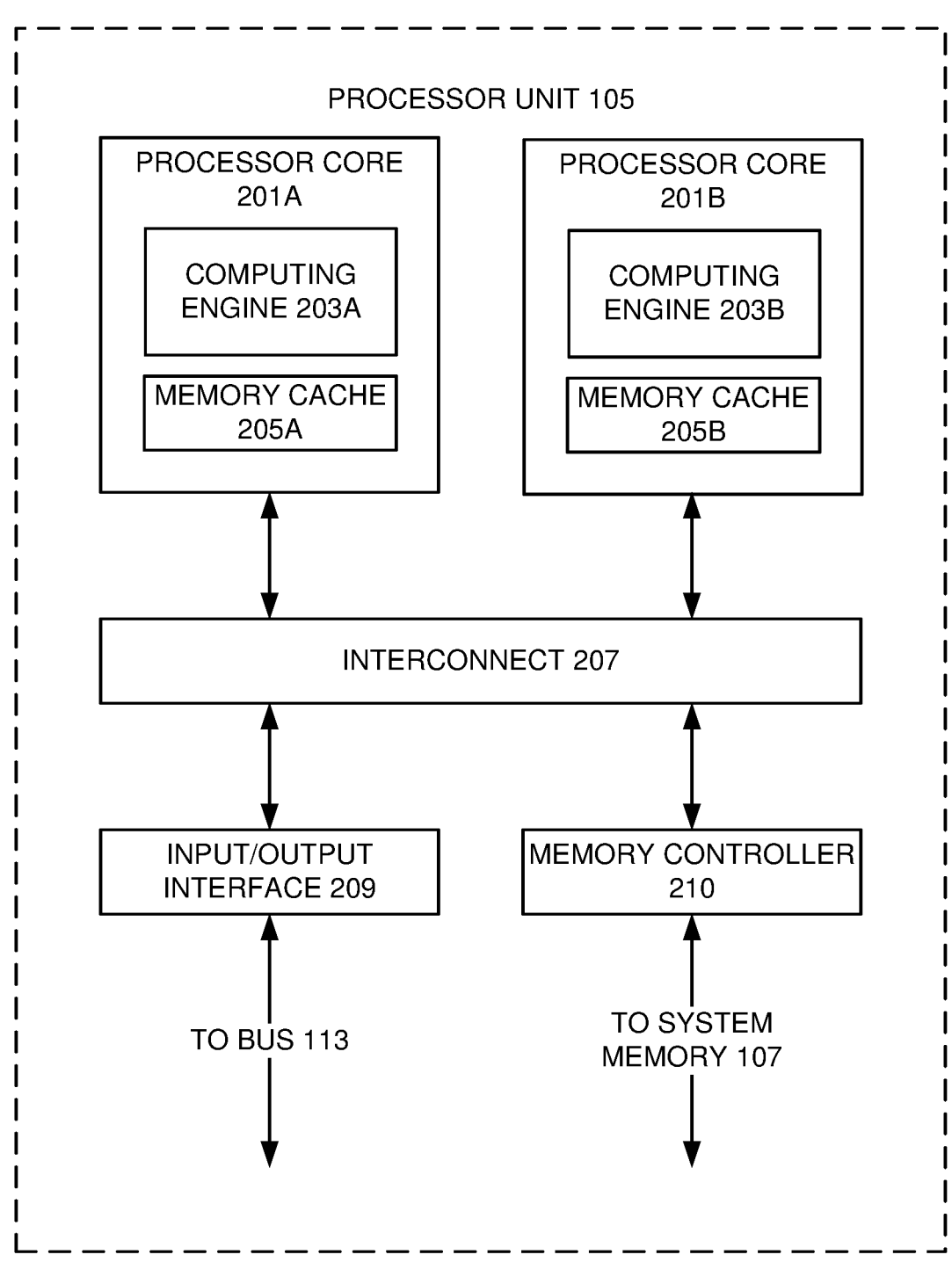

With some implementations, the processor unit 105 can have more than one processor core. Accordingly, FIG. 2 illustrates an example of a multi-core processor unit 105 that may be employed with various embodiments. As seen in this figure, the processor unit 105 includes a plurality of processor cores 201A and 201B. Each processor core 201A and 201B includes a computing engine 203A and 203B, respectively, and a memory cache 205A and 205B, respectively. As known to those of ordinary skill in the art, a computing engine 203A and 203B can include logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203A and 203B may then use its corresponding memory cache 205A and 205B, respectively, to quickly store and retrieve data and/or instructions for execution.

Each processor core 201A and 201B is connected to an interconnect 207. The particular construction of the interconnect 207 may vary depending upon the architecture of the processor unit 105. With some processor cores 201A and 201B, such as the Cell microprocessor created by Sony Corporation, Toshiba Corporation and IBM Corporation, the interconnect 207 may be implemented as an interconnect bus. With other processor units 201A and 201B, however, such as the Opteron™ and Athlon™ dual-core processors available from Advanced Micro Devices of Sunnyvale, California, the interconnect 207 may be implemented as a system request interface device. In any case, the processor cores 201A and 201B communicate through the interconnect 207 with an input/output interface 209 and a memory controller 210. The input/output interface 209 provides a communication interface to the bus 113. Similarly, the memory controller 210 controls the exchange of information to the system memory 107. With some implementations, the processor unit 105 may include additional components, such as a high-level cache memory accessible shared by the processor cores 201A and 201B. It also should be appreciated that the description of the computer network illustrated in FIG. 1 and FIG. 2 is provided as an example only, and it not intended to suggest any limitation as to the scope of use or functionality of alternate embodiments.

Layout-Based Wafer Defect Identification and Classification

Figures 3, 4:
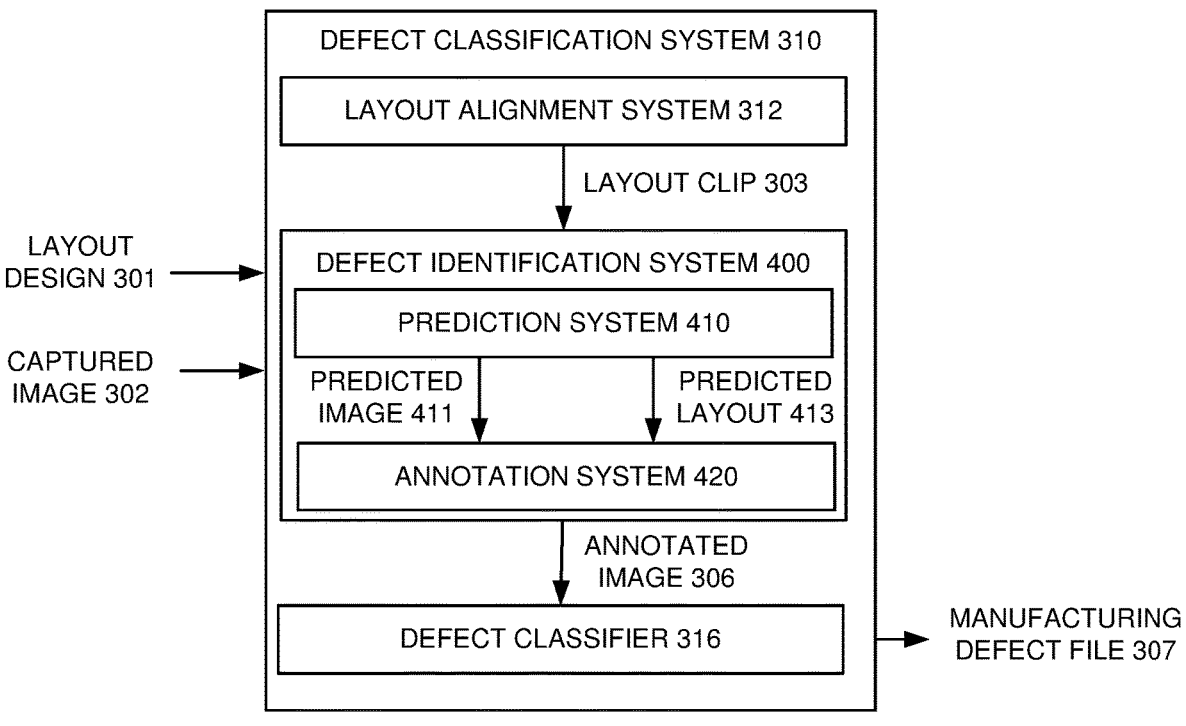
FIG. 3 illustrates an example of a defect classification system with machine learning-based defect detection and classification according to various embodiments.
FIG. 4 illustrates an example defect identification system in the defect classification system described in FIG. 3.

FIG. 3 illustrates an example of a defect classification system 310 with machine learning-based defect detection and classification according to various embodiments. Referring to FIG. 3, the defect classification system 310 can receive a layout design 301 of an electronic system. The layout design 301 can define geometrical information capable of being utilized to manufacture an integrated circuit, such as the electronic system, which can be specified in a Graphic Data System II (GDSII) format, an Open Access format, a Milkyway format, an EDDM format, an Open Artwork System Interchange Standard (OASIS) format, or the like. The defect classification system 310 also can receive a captured image 302 of a wafer manufactured to include the electronic system described by the layout design 301. In some embodiments, a scanning electron microscope (SEM) system can generate the captured image 302 by capturing an image of the electronic device manufactured on the wafer based on the layout design 301.

The defect classification system 310 can include a layout alignment system 312 to correlate the captured image 302 of the electronic device to a portion of the layout design 301 and to clip the portion of the layout design 301 corresponding to the captured image 302. In some embodiments, the captured image 302 can have coordinates, such as an x-coordinate and a y-coordinate, which can correlate to a location of the electronic device manufactured based on the layout design 301. The layout alignment system 312 can utilize the coordinates of the captured image to locate the corresponding portion of the layout design 301 to be clipped. The layout alignment system 312 can output a layout clip 303 corresponding to the clipped portion of the layout design 301 associated with the captured image 302.

The defect classification system 310 can include a defect identification system 400 to utilize the captured image 302 and the layout clip 303 to identify locations of defects in the electronic device manufactured on the wafer. In some embodiments, the defect identification system 400 can generate a predicted image 311 for the layout clip 303, for example, by predicting an image of an electronic device manufactured using the layout clip 303 that would expected to be captured by a scanning electron microscope system. The defect identification system 400 can compare the predicted image 411 against the captured image 302 to identify locations of defects in the electronic device manufactured on the wafer, and annotate the captured image 302 with the locations of the identified defects. For instance, when the defect identification system 400 identifies a defect location in the captured image 302, the defect identification system 400 can annotate the captured image 302 by highlighting the locations of the identified defects to generate the annotated image 306.

The identification system 400 also can generate a predicted layout 413 from the captured image 302, for example, by predicting an expected layout design that was used to manufacture the electronic device in the captured image 302. The defect identification system 400 can compare the predicted layout 413 against the layout clip 303 to identify locations of defects in the electronic device manufactured on the wafer, and annotate the captured image 302 with the locations of the identified defects. For instance, when the defect identification system 400 identifies a defect location in the captured image 302, the defect identification system 400 can annotate the captured image 302 by highlighting the locations of the identified defects to generate the annotated image 306. Embodiments of the defect identification system 400 will be described detail below with reference to FIG. 4.

FIG. 4 illustrates an example defect identification system 400 in the defect classification system 310 described in FIG. 3. Referring to FIGS. 3 and 4, the defect identification system 400 can include a prediction system 410 to receive the layout clip 303 and the captured image 302. The defect identification system 400 can generate the predicted image 411 from the layout clip 303 and/or generate the predicted layout 413 from the captured image 302. The prediction system 410 can include an image prediction system 412, for example, a computing system implementing a machine-learning algorithm trained to predict images from portions of layout designs, which can receive the layout clip 303 and, based on the trained machine-learning algorithm, output a predicted image 411. The predicted image 411 can correspond to an estimate of an image expected to be captured of an electronic device described by the layout clip 303 that was manufactured on a wafer. An example of image prediction from a layout design will be described below with reference to FIGS. 5A-5C.

Figures 5A, 5B, 5C:
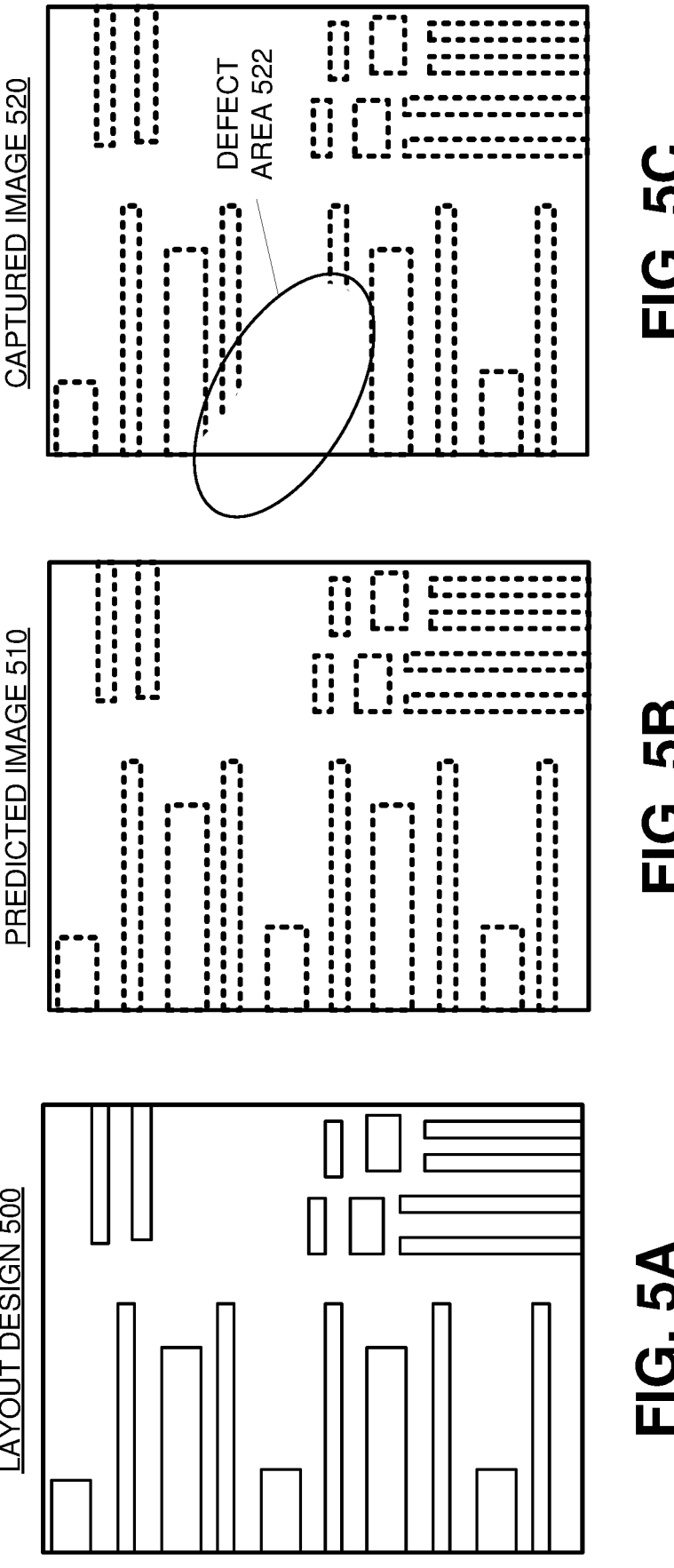
FIGS. 5A-5C illustrate examples of a layout clip, a predicted image, a captured image utilized in defect detection and classification according to various embodiments.

FIGS. 5A-5C illustrate examples of a layout clip 500, a predicted image 510, a captured image 530 utilized in defect detection and classification according to various embodiments. Referring to FIG. 5A, a layout design 500 of a portion of an electronic device. The layout design 500 can define geometrical information capable of being utilized to manufacture an integrated circuit, such as the electronic device, which can be specified in a Graphic Data System II (GDSII) format, an Open Access format, a Milkyway format, an EDDM format, an Open Artwork System Interchange Standard (OASIS) format, or the like.

Referring to FIG. 5B, the layout design 500 of FIG. 5A can be utilized to generate a predicted image 510. The predicted image 510 can correspond to an estimate of an image that could be captured of an electronic device having been manufactured with the layout design 500. In some embodiments, a computing system implementing a trained machine-learning algorithm can receive the layout design 500 and predict an image that could be captured of an electronic device having been manufactured with the layout design 500.

Referring to FIG. 5C, the captured image 520 can correspond to an electronic device manufactured using the layout design 500. In some embodiments, a scanning electron microscope (SEM) system can generate the captured image 520 by capturing an image of the electronic device manufactured on the wafer based on the layout design 500. The captured image 520 can include a defect area 522 having a defect in the manufactured electronic device, which can be identified through a comparison of the predicted image 510 with the captured image 520.

Referring back to FIGS. 3 and 4, the prediction system 410 can include a layout prediction system 414, for example, a computing system implementing a machine-learning algorithm trained to predict layout designs from captured images of electronic device manufactured on a wafer. The layout prediction system 414 can receive the captured image 302 and, based on the trained machine-learning algorithm, output a predicted layout 413, which estimates the layout design expected to have been used to manufacture an electronic device shown in the captured image 302. An example of layout prediction from a captured image will be described below with reference to FIGS. 6A-6C.

Figures 6A, 6B, 6C:
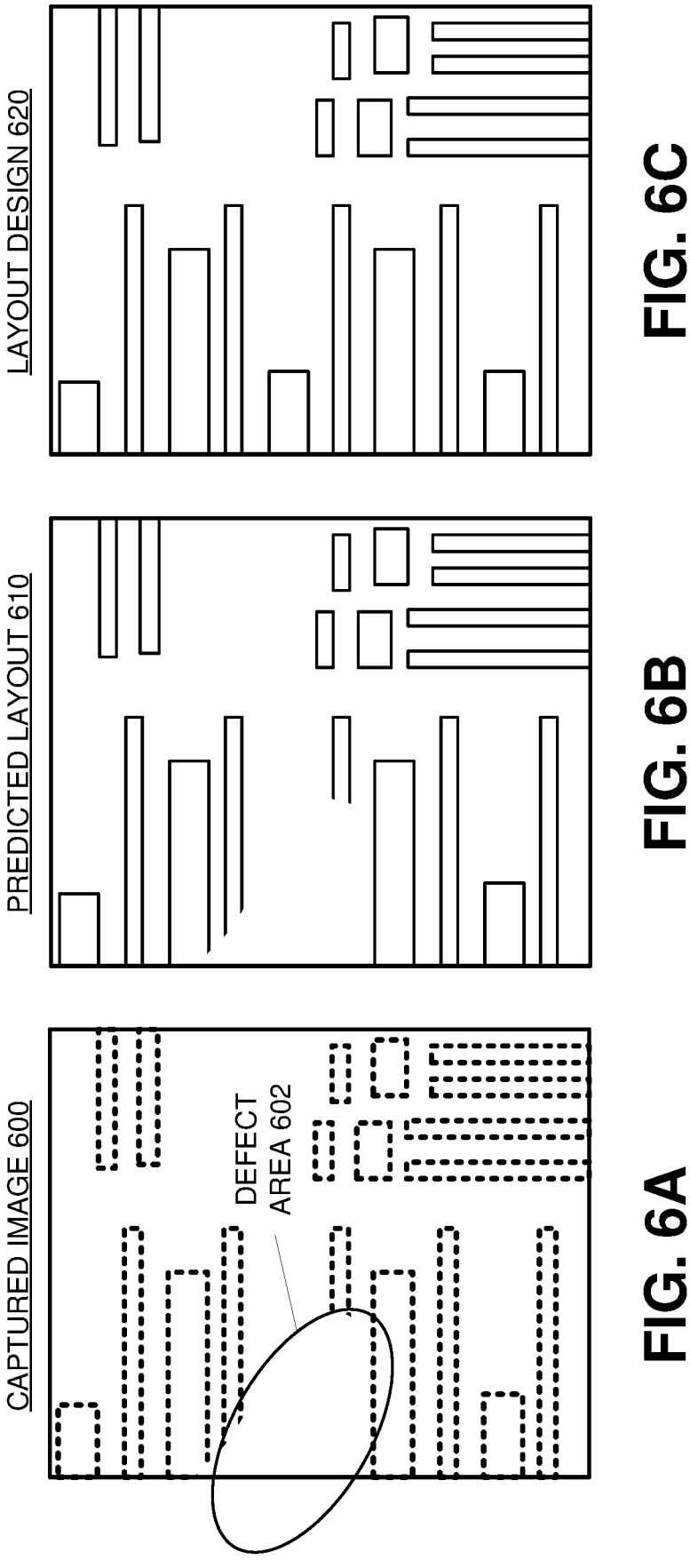
FIGS. 6A-6C illustrate examples of a captured image, a predicted layout design, and a layout design utilized in defect detection and classification according to various embodiments.

FIGS. 6A-6C illustrate examples of a captured image 600, a predicted layout 610, and a layout design 620 utilized in defect detection and classification according to various embodiments. Referring to FIG. 6A, the captured image 600 can correspond to an electronic device manufactured using the layout design 620. In some embodiments, a scanning electron microscope (SEM) system can generate the captured image 600 by capturing an image of the electronic device manufactured on the wafer based on the layout design 500. The captured image 600 can include a defect area 602 having a defect in the manufactured electronic device.

Referring to FIG. 6B, the captured image 600 of FIG. 6A can be utilized to generate a predicted layout 610. The predicted layout 610 can correspond to an estimate of a layout design that could be utilized to manufacture an electronic device in the captured image 600. In some embodiments, a computing system implementing a trained machine-learning algorithm can receive the captured image 600 and predict a layout design that could be utilized to manufacture an electronic device in the captured image 600.

Referring to FIG. 6C, a layout design 620 of a portion of an electronic device. The layout design 620 can define geometrical information capable of being utilized to manufacture an integrated circuit, such as the electronic device, which can be specified in a Graphic Data System II (GDSII) format, an Open Access format, a Milkyway format, an EDDM format, an Open Artwork System Interchange Standard (OASIS) format, or the like. By comparing the layout design 620 with the predicted layout 610, a defect in the defect area 602 in the captured image 600 can be identified.

Referring back to FIGS. 3 and 4, the defect identification system 400 can include an annotation system 420 to detect defects in the manufactured electronic device shown in the captured image 302 based on a combination of the predicted image 411 and the captured image 302 and/or a combination of the predicted layout 413 and the layout clip 303. The annotation system 420 can include a comparison system 422 to compare the predicted image 411 with the captured image 302 and determine differences between predicted image 411 and the captured image 302 based on the comparison. The comparison system 422 also can compare the predicted layout 413 with the layout clip 303 and determine differences between predicted layout 413 and the layout clip 303 based on the comparison.

The annotation system 420 can include a defect identification system 424 to identify defects in the manufactured electronic device corresponding to the captured image 302 based on the differences between predicted image 411 and the captured image 302 or the differences between predicted layout 413 and the layout clip 303. In some embodiments, the defect identification system 424 can identify a defect in the electronic device when a magnitude of a difference with the between predicted image 411 and the captured image 302 exceeds a threshold level. The defect identification system 424 can identify a defect in the manufactured electronic device when a magnitude of a difference between predicted layout 413 and the layout clip 303 exceeds a threshold level.

The annotation system 420 can modify the captured image 302 based on the identified defects in the electronic device. In some embodiments, the annotation system 420 can highlight or otherwise annunciate the capture image 302 at the location associated with the identified defect in the electronic device. The annotation system 420 can output an annotated image 306, which can correspond to the modified version of the captured image 302.

Referring to FIG. 3, the defect classification system 310 can include a defect classifier 316 to receive the annotated image 306 from the defect identification system 400. The defect classification system 310 can utilize the annotations in the annotated image 306 to determine the locations of the identified defects and then determine one or more characteristics associated with the identified defects. For instance, the defect classification system 310 can analyze the defect annunciated in the annotated image 306 to determine a defect type, such as missing structures, residues, scratches, multiple lines missing, or the like, for the defect. In some embodiments, the defect classification system 310 can be implemented by a machine-learning algorithm, such as a You-Only-Look-Once (YOLO) type algorithm, trained with labeled images of defects, which when presented the annotated image 306, can assign one or more defects labels to the annotated portion(s) of the annotated image 306. The defect label(s) assigned to the annotated image 306 can annunciate the presence of a defect and the type of defect detected by the defect classification system 310.

The defect classification system 310 can generate a manufacturing defect file 307 based on the identification and classification of the defect in the captured image 302. The manufacturing defect file 307, in some examples, can be a text file, which includes a location of the defect in the electronic device, a type of defect identified at the location, include a bounding box around the defect location, or the like. The defect classification system 310 can provide the manufacturing defect file 307 to a downstream design-guided analysis tool to determine a root cause for the identified and classified defect or to perform repair.

FIG. 7 illustrates a flowchart showing example machine learning-based defect detection and classification with a predicted image of the electronic device according to various examples. Referring to FIG. 7, in a block 701, a computing system implementing a defect classification system can align a captured image of an electronic device to a layout design of the electronic device and, in a block 702, the computing system implementing the defect classification system can clip a portion of the layout design corresponding to the image of the electronic device. In some embodiments, the captured image can have coordinates, such as an x-coordinate and a y-coordinate, which can correlate to a location of the electronic device manufactured based on the layout design. The defect classification system can utilize the coordinates of the captured image to locate the corresponding portion of the layout design to be clipped. The defect classification system can output a layout clip corresponding to the clipped portion of the layout design associated with the captured image.

In a block 703, the computing system implementing the defect classification system can generate a predicted image of the electronic device based on the clipped portion of the layout design. In some embodiments, the defect classification system can include a computing system implementing a machine-learning algorithm trained to predict images from portions of layout designs, which can receive the clipped portion of the layout design and, based on the trained machine-learning algorithm, output a predicted image. The predicted image can correspond to an estimate of an image expected to be captured of a manufactured electronic device described by the clipped portion of the layout design.

In a block 704, the computing system implementing the defect classification system can detect one or more differences between the predicted image of the electronic device and the captured image of the electronic device. The defect classification system can compare the predicted image of the electronic device and the captured image of the electronic device to identify any differences. In some embodiments, the defect classification system can identify a defect in the electronic device when a magnitude of a difference with the between predicted image and the captured image exceeds a threshold level.

In a block 705, the computing system implementing the defect classification system can annotate the capture image of the electronic device with one or more of the differences between the predicted image of the electronic device and the captured image of the electronic device. The defect classification system can modify the captured image based on the identified defects in the electronic device. In some embodiments, the defect classification system can highlight or otherwise annunciate the defects in the capture image at the location associated with the identified defect in the electronic device.

In a block 706, the computing system implementing the defect classification system can utilize the annotations in the captured image to detect and classify manufacturing defects in the electronic device. The defect classification system can utilize the annotations in the captured image to determine the locations of the identified defects and then determine one or more characteristics associated with the identified defects. For instance, the defect classification system can analyze the defect annunciated in the captured image to determine a defect type, such as missing structures, residues, scratches, multiple lines missing, or the like, for the defect. In some embodiments, the defect classification system can be implemented by a machine-learning algorithm, such as a You-Only-Look-Once (YOLO) type algorithm, trained with labeled images of defects, which when presented the captured image, can assign one or more defects labels to the annotated portion(s) of the captured image. The defect label(s) assigned to the captured image can annunciate the presence of a defect and the type of defect detected by the defect classification system.

The defect classification system also can generate a manufacturing defect file based on the identification and classification of the defect in the captured image. The manufacturing defect file, in some examples, can be a text file, which includes a location of the defect in the electronic device, a type of defect identified at the location, include a bounding box around the defect location, or the like. The defect classification system can provide the manufacturing defect file to a downstream design-guided analysis tool to determine a root cause for the identified and classified defect or to perform repair.

FIG. 8 illustrates a flowchart showing example machine learning-based defect detection and classification with a predicted layout design of the electronic device according to various examples. Referring to FIG. 8, in a block 801, a scanning electron microscope system can capture an image of an electronic device manufactured based on a layout design describing the electronic device. In some embodiments, the scanning electron microscope system can include a scanning electron microscope to capture one or more images of a manufactured electronic device.

In a block 802, the computing system implementing a defect classification system can generate a predicted layout design of the electronic device based on the captured image of the electronic device. In some embodiments, the defect classification system can include a computing system implementing a machine-learning algorithm trained to predict layout designs from captured images of electronic devices. The predicted layout design can correspond to an estimate of a layout design used to manufacture the electronic device in the imaged captured by the scanning electron microscope system.

In a block 803, the computing system implementing the defect classification system can detect one or more differences between the layout design of the electronic device and the predicted layout design of the electronic device. The defect classification system can compare the predicted layout design and the layout design to identify any differences.

In some embodiments, the defect classification system can identify a defect in the electronic device when a magnitude of a difference with the between predicted layout design and the layout design exceeds a threshold level.

In a block 804, the computing system implementing the defect classification system can annotate the capture image of the electronic device with one or more of the differences between the predicted layout design of the electronic device and the layout design of the electronic device. The defect classification system can modify the captured image based on the identified defects in the electronic device. In some embodiments, the defect classification system can highlight or otherwise annunciate the defects in the capture image at the location associated with the identified defect in the electronic device.

In a block 805, the computing system implementing the defect classification system can utilize the annotations in the captured image to detect and classify manufacturing defects in the electronic device. The defect classification system can utilize the annotations in the captured image to determine the locations of the identified defects and then determine one or more characteristics associated with the identified defects. For instance, the defect classification system can analyze the defect annunciated in the captured image to determine a defect type, such as missing structures, residues, scratches, multiple lines missing, or the like, for the defect. In some embodiments, the defect classification system can be implemented by a machine-learning algorithm, such as a You-Only-Look-Once (YOLO) type algorithm, trained with labeled images of defects, which when presented the captured image, can assign one or more defects labels to the annotated portion(s) of the captured image. The defect label(s) assigned to the captured image can annunciate the presence of a defect and the type of defect detected by the defect classification system.

The defect classification system also can generate a manufacturing defect file based on the identification and classification of the defect in the captured image. The manufacturing defect file, in some examples, can be a text file, which includes a location of the defect in the electronic device, a type of defect identified at the location, include a bounding box around the defect location, or the like. The defect classification system can provide the manufacturing defect file to a downstream design-guided analysis tool to determine a root cause for the identified and classified defect or to perform repair.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

CONCLUSION

While the application describes specific examples of carrying out embodiments of the invention, those skilled in the art will appreciate that there are numerous variations and permutations of the above described systems and techniques that fall within the spirit and scope of the invention as set forth in the appended claims. For example, while specific terminology has been employed above to refer to electronic design automation processes, it should be appreciated that various examples of the invention may be implemented using any desired combination of electronic design automation processes.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A method comprising:
capturing, by a scanning electron microscope system, a scanning electron microscope (SEM) image of an electronic device manufactured according to a layout design describing the electronic device;
separately generating, by a computing system, both a predicted image of the electronic device and a predicted layout design of the electronic device, wherein the predicted image of the electronic device is generated directly from a portion of the layout design describing the electronic device, wherein the predicted layout design of the electronic device is generated directly from the SEM captured image of the electronic device, wherein the predicted image corresponds to an expected image of the electronic device to be captured by the scanning electron microscope system, wherein the predicted layout design of the electronic device is separate from the predicted image of the electronic device, and wherein the predicted layout design corresponds to an expected layout design utilized to manufacture the electronic design system in the captured image;
identifying, by the computing system, one or more manufacturing defects present in the electronic device based on at least one of differences between the predicted layout design of the electronic device and the layout design and differences between the predicted image of the electronic device and the captured SEM image of the electronic device; and
utilizing, by the computing system, the captured SEM image of the electronic device to classify the manufacturing defects identified based on the predicted image of the electronic device from the layout design.

2. The method of claim 1, wherein utilizing the layout design to generate the predicted image further comprising:
aligning the capture image of the electronic device to a portion of the layout design;
clipping the portion of the layout design aligned to the captured image of the electronic device; and
generating the predicted image of the electronic device from the clipped portion of the layout design.

3. The method of claim 1, further comprising:
comparing, by the computing system, the predicted image of the electronic device and the captured image of the electronic device; and
annotating, by the computing system, the captured image of the electronic device with the differences between the predicted image of the electronic device and the captured image of the electronic device.

4. The method of claim 1, further comprising:
generating, by the computing system, a manufacturing defect report identifying locations of the manufacturing defects in the electronic device and classifications of the manufacturing defects; and
performing, by the computing system, repair of the electronic device or modification of the layout design based, at least in part, on a root cause of the manufacturing defect identified using the manufacturing defect report.

5. The method of claim 1, further comprising utilizing, by the computing system, the captured SEM image of the electronic device to classify the manufacturing defects identified based on the differences between the predicted layout design of the electronic device and the layout design.

6. The method of claim 1, wherein generating the predicted image of the electronic device using the layout design is performed using a first machine-learning algorithm implemented by the computing system, and wherein utilizing the captured image of the electronic device to classify the manufacturing defects identified based on the predicted image of the electronic device from the layout design is performed using a second machine-learning algorithm implemented by the computing system.

7. A system comprising:
a scanning electron microscope system configured to capture a scanning electron microscope (SEM) image of an electronic device manufactured according to a layout design describing the electronic device;
a memory system configured to store computer-executable instructions; and
a computing system, in response to execution of the computer-executable instructions, is configured to:
separately generate both a predicted image of the electronic device and a predicted layout design of the electronic device, wherein the predicted image of the electronic device is generated directly from a portion of the layout design describing the electronic device, wherein the predicted layout design of the electronic device is generated directly from the SEM captured image of the electronic device, wherein the predicted image corresponds to an expected image of the electronic device to be captured by the scanning electron microscope system, wherein the predicted layout design of the electronic device is separate from the predicted image of the electronic device, and wherein the predicted layout design corresponds to an expected layout design utilized to manufacture the electronic design system in the captured image;
identify one or more manufacturing defects present in the electronic device based on at least one of differences between the predicted layout design of the electronic device and the layout design and differences between the predicted image of the electronic device and the captured SEM image of the electronic device; and
utilize the captured SEM image of the electronic device to classify the manufacturing defects identified based on the predicted image of the electronic device from the layout design.

8. The system of claim 7, wherein the computing system, in response to execution of the computer-executable instructions, is further configured to:
align the capture image of the electronic device to a portion of the layout design;
clip the portion of the layout design aligned to the captured image of the electronic device; and
generate the predicted image of the electronic device from the clipped portion of the layout design.

9. The system of claim 7, wherein the computing system, in response to execution of the computer-executable instructions, is further configured to:
compare the predicted image of the electronic device and the captured image of the electronic device; and annotate the captured image of the electronic device with the differences between the predicted image of the electronic device and the captured image of the electronic device.

10. The system of claim 7, wherein the computing system, in response to execution of the computer-executable instructions, is further configured to:
generate a manufacturing defect report identifying locations of the manufacturing defects in the electronic device and classifications of the manufacturing defects; and
perform repair of the electronic device or modification of the layout design based, at least in part, on a root cause of the manufacturing defect identified using the manufacturing defect report.

11. The system of claim 7, wherein the computing system, in response to execution of the computer-executable instructions, is further configured to utilize the captured image of the electronic device to classify the manufacturing defects identified based on the differences between the predicted layout design of the electronic device and the layout design.

12. An apparatus comprising at least one non-transitory computer-readable memory device storing instructions configured to cause one or more processing devices to perform operations comprising:
separately generating both a predicted image of an electronic device and a predicted layout design of the electronic device, wherein the predicted image of the electronic device is generated directly from a portion of the layout design describing the electronic device, wherein the predicted layout design of the electronic device is generated directly from a captured scanning electron microscope (SEM) image of the electronic device, wherein the captured SEM image is an image of the electronic device captured by a scanning electron microscope (SEM) system, wherein the predicted image corresponds to an expected image of the electronic device to be captured by the scanning electron microscope system, wherein the predicted layout design of the electronic device is separate from the predicted image of the electronic device, and wherein the predicted layout design corresponds to an expected layout design utilized to manufacture the electronic design system in the captured image;
identifying one or more manufacturing defects present in the electronic device based on at least one of differences between the predicted layout design of the electronic device and the layout design and differences between the predicted image of the electronic device and the captured SEM image of the electronic device; and
utilizing the captured SEM image of the electronic device to classify the manufacturing defects identified based on the predicted image of the electronic device from the layout design.

13. The apparatus of claim 12, wherein utilizing the layout design to generate the predicted image further comprising:
aligning the capture image of the electronic device to a portion of the layout design;
clipping the portion of the layout design aligned to the captured image of the electronic device; and
generating the predicted image of the electronic device from the clipped portion of the layout design.

14. The apparatus of claim 12, wherein the instructions are configured to cause one or more processing devices to perform operations further comprising:

comparing the predicted image of the electronic device and the captured image of the electronic device; and annotating the captured image of the electronic device with the differences between the predicted image of the electronic device and the captured image of the electronic device.

15. The apparatus of claim 12, wherein the instructions are configured to cause one or more processing devices to perform operations further comprising:

generating a manufacturing defect report identifying locations of the manufacturing defects in the electronic device and classifications of the manufacturing defects; and performing repair of the electronic device or modification of the layout design based, at least in part, on a root cause of the manufacturing defect identified using the manufacturing defect report.

16. The apparatus of claim 12, wherein the instructions are configured to cause one or more processing devices to perform operations further comprising utilizing the captured SEM image of the electronic device to classify the manufacturing defects identified based on the differences between the predicted layout design of the electronic device and the layout design.

17. The apparatus of claim 12, wherein generating the predicted image of the electronic device using the layout design is performed using a first machine-learning algorithm implemented by the one or more processing devices, and wherein utilizing the captured image of the electronic device to classify the manufacturing defects identified based on the predicted image of the electronic device from the layout design is performed using a second machine-learning algorithm implemented by the one or more processing devices.

* * * * *